United States Patent
Chien

(10) Patent No.: US 10,138,383 B2
(45) Date of Patent: Nov. 27, 2018

(54) ANTI-FOGGING COATING COMPOSITION, AND ANTI-FOGGING FILM AND TRANSPARENT ARTICLE USING THE SAME

(71) Applicant: MiiCs & Partners (Shenzhen) Co., Ltd., Shenzhen (CN)

(72) Inventor: Hsiu-Wen Chien, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/485,391

(22) Filed: Apr. 12, 2017

(65) Prior Publication Data

US 2018/0022943 A1  Jan. 25, 2018

(30) Foreign Application Priority Data

Jul. 22, 2016   (TW) .............................. 105123336 A

(51) Int. Cl.
| | | |
|---|---|---|
| C09K 3/18 | (2006.01) | |
| C09D 7/63 | (2018.01) | |
| C09D 7/12 | (2006.01) | |
| C09D 5/00 | (2006.01) | |
| C09D 179/02 | (2006.01) | |
| C09D 7/61 | (2018.01) | |
| C08K 5/17 | (2006.01) | |
| C08K 3/36 | (2006.01) | |
| C08K 3/22 | (2006.01) | |

(52) U.S. Cl.
CPC ................. *C09D 7/63* (2018.01); *C09D 5/00* (2013.01); *C09D 7/1216* (2013.01); *C09D 7/1233* (2013.01); *C09D 7/61* (2018.01); *C09D 179/02* (2013.01); *C09K 3/18* (2013.01); *C08K 3/36* (2013.01); *C08K 5/17* (2013.01); *C08K 2003/2244* (2013.01)

(58) Field of Classification Search
CPC ... C09K 3/18; C09D 5/00; C09D 5/17; C09D 7/61; C09D 7/63; C09D 179/02
See application file for complete search history.

(56) References Cited

U.S. PATENT DOCUMENTS

2017/0123229 A1* 5/2017 Chien .................... G02C 7/046

* cited by examiner

*Primary Examiner* — Edward J Cain
(74) *Attorney, Agent, or Firm* — ScienBiziP, P.C.

(57) ABSTRACT

An anti-fogging coating composition comprises a dopamine, a hydrophilic polymer, a plurality of inorganic oxide particles, and a solvent. The dopamine reduces film forming time of an anti-fogging coating. An anti-fogging film using the anti-fogging coating composition, and a transparent article using the anti-fogging film are also provided.

20 Claims, 3 Drawing Sheets

ANTI-FOGGING COATING COMPOSITION, AND ANTI-FOGGING FILM AND TRANSPARENT ARTICLE USING THE SAME

FIELD

The subject matter herein generally relates to a coating composition, and more particularly, to an anti-fogging coating composition, an anti-fogging film using the anti-fogging coating composition, and a transparent article using the anti-fogging film.

BACKGROUND

When a transparent article, such as optical lenses, spectacles, goggles, transparent covers for military helmets, or window panels for vehicles, moves from a high humidity area to a colder area, a surface of the transparent article will be fogged or misted over with a layer of droplets, which obscure or restrict visibility through the transparent article. An anti-fogging film can be used on the surface of the transparent article to prevent fogging. The anti-fogging film is generally formed by an anti-fogging coating.

BRIEF DESCRIPTION OF THE DRAWINGS

Implementations of the present technology will now be described, by way of example only, with reference to the attached figures.

DETAILED DESCRIPTION

Figure 1:
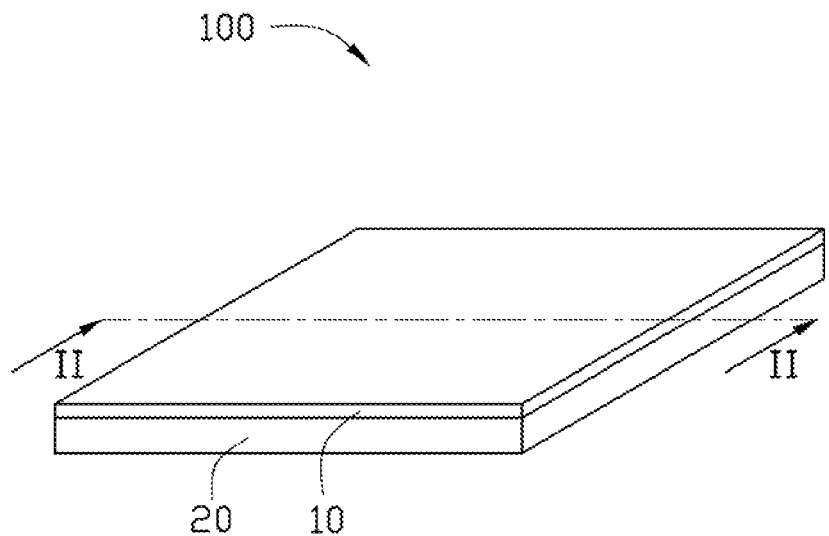
FIG. 1 is a diagrammatic view of an exemplary embodiment of a transparent article of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprising" when utilized, means "including, but not necessarily limited to"; it specifically indicates open-ended inclusion or membership in the so-described combination, group, series, and the like. The term "about" when utilized, means "not only includes the numerical value, but also include numbers closest to the numerical value".

An exemplary embodiment of an anti-fogging coating composition comprises a dopamine, a hydrophilic polymer, a plurality of inorganic oxide particles, and a solvent.

The dopamine has a mass percentage of about 1% to about 20% of a total mass of the anti-fogging coating composition. The hydrophilic polymer has a mass percentage of about 10% to about 45% of the total mass of the anti-fogging coating composition. The plurality of the inorganic oxide particles has a mass percentage of about 40% to about 80% of the total mass of the anti-fogging coating composition. The solvent has a mass percentage of about 5% to about 47% of the total mass of the anti-fogging coating composition.

In at least one exemplary embodiment, the anti-fogging coating composition has a PH value of about 8.0 to about 10.5. The PH value is conducive to oxidation of the dopamine.

A chemical structure formula of the dopamine is:

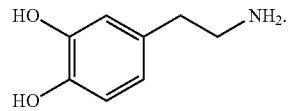

The dopamine has a catechol functional group. The hydrophilic polymer has at least one amino-group. When the anti-fogging coating composition is put in an alkaline or oxidizing condition, the catechol functional group of the dopamine can be oxidized to form a dopamine quinone containing a benzoquinone structure. The dopamine quinone can disproportionately react with the dopamine to form a semi-quinone radical, and couple to form a cross-linking bond. The catechol functional group of the dopamine can also react with the amino-group of the hydrophilic polymer with a Michael-type addition reaction or Schiff base reaction. Thereby, an anti-fogging film can be formed. The inorganic oxide particles are dispersed in the anti-fogging film.

The hydrophilic polymer may be selected from a linear polymer, a nonlinear polymer, or combination thereof. The hydrophilic polymer can prevent the inorganic oxide particles from agglomerating together, and increase a hydrophilicity of the anti-fogging coating composition.

The linear polymer may be selected from a polymer of hydrophilic monomer and N-(3-Aminopropyl)methacrylamide (1°-N), a polymer of hydrophilic monomer and N-[3-(Dimethylamino)propyl]methacrylamide (2°-N), a polymer of hydrophilic monomer and [3-(Methacryloylamino)propyl]trimethylammonium (3°-N), or any combination thereof.

The hydrophilic monomer may be selected from polyethylene glycol methacrylic acid, N-vinylpyrrolidone, N,N-Dimethylacrylamide, allyl phenyl ether, or any combination thereof.

A chemical structure formula of the linear polymer may be:

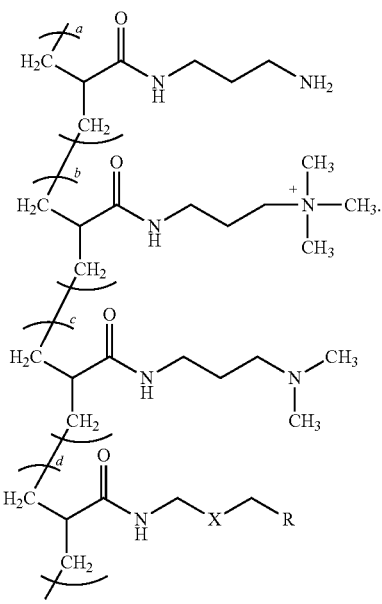

In the chemical structure formula of the linear polymer above, the R is a functional group. In at least one exemplary embodiment, the R may be selected from hydroxyl or amino-group; the X is $(CH_2)_m$, the m is a positive integer; the a is a positive integer; the b is a positive integer; the c is a positive integer; and the d is a positive integer.

The nonlinear polymer may be a derivative of polyethyleneimine (PEI). The derivative of polyethyleneimine may be selected from a polymer of polyethyleneimine and polyethylene glycol (PEG), a polymer of polyethyleneimine and polyvinyl pyrrolidone (PVP), or combination thereof.

A chemical structure formula of the nonlinear polymer may be:

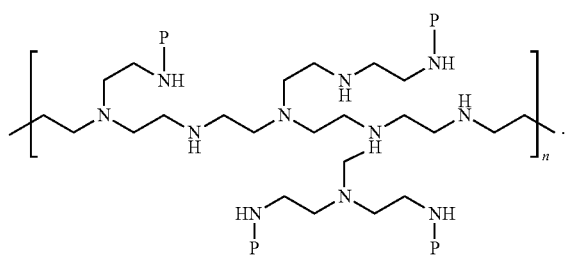

In the chemical structure formula of the nonlinear polymer above, the P is a functional polymer group. In at least one exemplary embodiment, the P may be a polyethylene glycol functional group or a polyvinyl pyrrolidone functional group. The n is a positive integer.

The plurality of inorganic oxide particles may be selected from particles of silica, zirconia, alumina, titanium, or any combination thereof. The inorganic oxide particle can increase a hardness and a refractive index of an anti-fogging film formed by the anti-fogging coating composition.

A particle diameter of the inorganic oxide particle is about 1 nm to about 1000 nm. Preferably, the particle diameter of the inorganic oxide particle is about 1 nm to about 300 nm.

The solvent may be water, an alcohol aqueous solution, or an oxidizing aqueous solution. The alcohol aqueous solution may be a methanol aqueous solution, an ethanol aqueous solution, or a propanol aqueous solution. The oxidizing aqueous solution may be sodium periodate ($NaIO_4$) aqueous solution. When the solvent is alcohol aqueous solution or oxidizing aqueous solution, the PH of the anti-fogging coating composition may be adjusted to a range of about 8.0 to about 10.5 by a sodium hydroxide solution.

Figure 2:
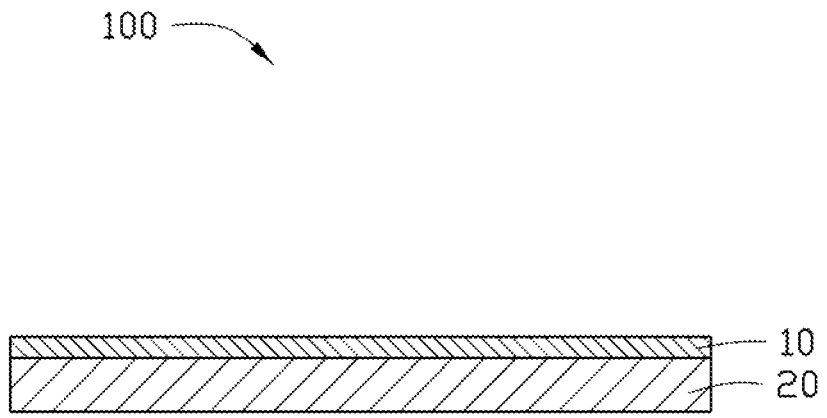
FIG. 2 is a cross-sectional view of the transparent article taken along line II-II of FIG. 1.

FIG. 1 and FIG. 2 illustrate a transparent article 100. The transparent article 100 includes a substrate 20 and an anti-fogging film 10 attached to at least one surface of the substrate 20. The substrate 20 and the anti-fogging film 10 are transparent. The anti-fogging film 10 is formed by coating the anti-fogging coating composition on the surface of the substrate 20.

The anti-fogging film 10 comprises a polymer of dopamine and hydrophilic polymer. The polymer has a cross-linking structure. The anti-fogging film 10 further comprises a plurality of inorganic oxide particles dispersed in the cross-linking structure. A material of the substrate 20 may be glass or resin.

Figure 3:
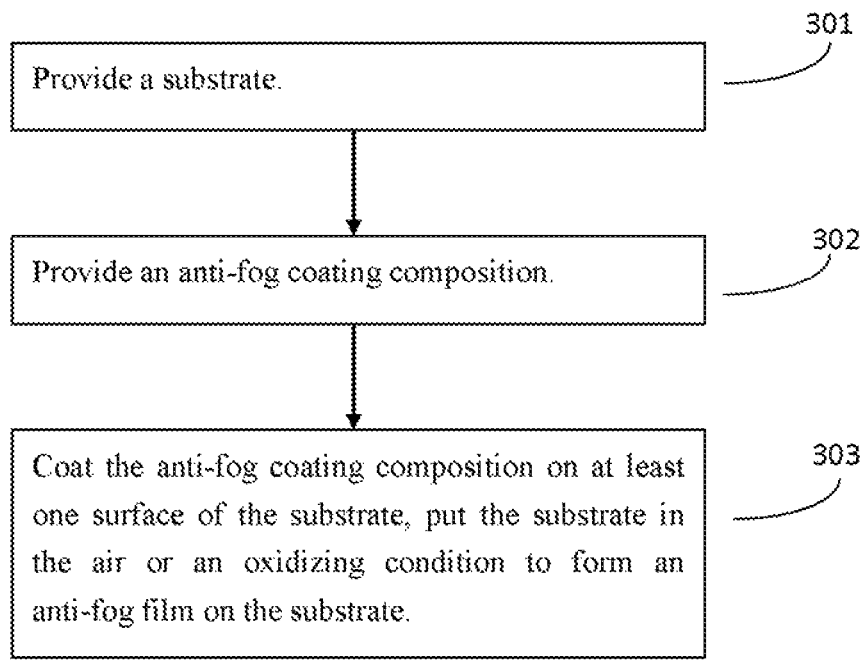
FIG. 3 illustrates a flowchart of a method for making a transparent article in accordance with an exemplary embodiment of the present application.

FIG. 3 illustrates a flowchart of a method for making the transparent article 100 in accordance with an exemplary embodiment. The exemplary method is provided by way of example, as there are a variety of ways to carry out the method. Each block shown in FIG. 3 represents one or more processes, methods or subroutines, carried out in the exemplary method. Furthermore, the illustrated order of blocks is by example only, and the order of the blocks can change. Additional blocks may be added, or fewer blocks may be utilized, without departing from this disclosure. The exemplary method may begin at block 301.

At block 301, a substrate 20 is provided. The substrate 20 may be made of glass or resin. The substrate 20 is transparent.

At block 302, an anti-fogging coating composition is provided. The anti-fogging coating composition comprises a dopamine, a hydrophilic polymer, a plurality of inorganic oxide particles, and a solvent. The dopamine has a mass percentage of about 1% to about 20% of a total mass of the anti-fogging coating composition. The hydrophilic polymer has a mass percentage of about 10% to about 45% of the total mass of the anti-fogging coating composition. The plurality of the inorganic oxide particles has a mass percentage of about 40% to about 80% of the total mass of the anti-fogging coating composition. The solvent has a mass percentage of about 5% to about 47% of the total mass of the anti-fogging coating composition.

At block 303, at least one surface of the substrate 20 is coated with the anti-fogging coating composition, and then put in the air or an oxidizing condition to have the dopamine and the hydrophilic polymer in the anti-fogging coating composition react to form an anti-fogging film 10 on the substrate 20.

The anti-fogging film 10 and the substrate 20 are bonded together by covalent bond, intermolecular interaction force, hydrogen bond, π-π bond, or any combination thereof. Thereby an adhesion strength between the anti-fogging film 10 and the substrate 20 is strong.

An oxidation rate of the dopamine in the alkaline or oxidizing condition is fast, thereby the anti-fogging film 10 can be formed on the surface of the substrate 20 quickly.

In at least one exemplary embodiment, the anti-fogging coating composition is coated on the at least one surface of the substrate 20 by spray coating process or spin coating process. In another exemplary embodiment, the anti-fogging coating composition is coated on the surface of the substrate 20 by immersing the substrate 20 into the anti-fogging coating composition, and then taking the substrate 20 out, thereby a portion of the anti-fogging coating composition is adsorbed on the surface of the substrate 20.

EXAMPLE 1

The anti-fogging coating composition comprised dopamine, polymer of polyethyleneimine and polyethylene glycol, silica particles, zirconia particles, and water.

The dopamine had a mass percentage of 9% of the total mass of the anti-fogging coating composition. The polymer of polyethyleneimine and polyethylene glycol had a mass percentage of 22.3% of the total mass of the anti-fogging coating composition. The silica particles had a mass percentage of 32.7% of the total mass of the anti-fogging coating composition. The zirconia particles had a mass percentage of 21.8% of the total mass of the anti-fogging coating composition. The water had a mass percentage of 14.2% of the total mass of the anti-fogging coating composition.

The substrate 20 was immersed into the anti-fogging coating composition for 1 hour, and then taken out, an anti-fogging film 10 was formed on the surface of the substrate 20.

The anti-fogging film 10 was performed by a surface hardness test. The surface hardness test was carried out by a pencil hardness test method. The result showed that the surface hardness of the anti-fogging film 10 was 1H.

EXAMPLE 2

The anti-fogging coating composition comprised dopamine, polymer of polyethyleneimine and polyethylene glycol, silica particles, zirconia particles, and methanol aqueous solution.

The dopamine had a mass percentage of 10.3% of the total mass of the anti-fogging coating composition. The polymer of polyethyleneimine and polyethylene glycol had a mass percentage of 21.1% of the total mass of the anti-fogging coating composition. The silica particles had a mass percentage of 23.58% of the total mass of the anti-fogging coating composition. The zirconia particles had a mass percentage of 28.82% of the total mass of the anti-fogging coating composition. The methanol aqueous solution had a mass percentage of 16.2% of the total mass of the anti-fogging coating composition.

The substrate 20 was immersed into the anti-fogging coating composition for 2 hours, and then taken out, an anti-fogging film 10 was formed on the surface of the substrate 20.

The anti-fogging film 10 was performed by a surface hardness test. The surface hardness test was carried out by a pencil hardness test method. The result showed that the surface hardness of the anti-fogging film 10 was 2H.

EXAMPLE 3

The anti-fogging coating composition comprised dopamine, polymer of polyethyleneimine and polyvinyl pyrrolidone, silica particles, zirconia particles, titania particles, and $NaIO_4$ aqueous solution.

The dopamine had a mass percentage of 14.3% of the total mass of the anti-fogging coating composition. The polymer of polyethyleneimine and polyvinyl pyrrolidone had a mass percentage of 17.8% of the total mass of the anti-fogging coating composition. The silica particles had a mass percentage of 24.12% of the total mass of the anti-fogging coating composition. The zirconia particles had a mass percentage of 24.12% of the total mass of the anti-fogging coating composition. The titania particles had a mass percentage of 5.36% of the total mass of the anti-fogging coating composition. The $NaIO_4$ aqueous solution had a mass percentage of 14.3% of the total mass of the anti-fogging coating composition.

The substrate 20 was immersed into the anti-fogging coating composition for 0.5 hour, and then taken out, an anti-fogging film 10 was formed on the surface of the substrate 20.

The anti-fogging film 10 was performed by a surface hardness test. The surface hardness test was carried out by a pencil hardness test method. The result showed that the surface hardness of the anti-fogging film 10 was 2H.

Referring to the examples 1-3, the anti-fogging film 10 not only has a good anti fogging performance, but also has a high surface hardness. A high surface hardness means a strong scratch resistance.

The embodiments shown and described above are only examples. Even though numerous characteristics and advantages of the present technology have been set forth in the foregoing description, together with details of the structures and function of the present disclosure, the disclosure is illustrative only, and changes can be made in the detail, including in matters of shape, size, and arrangement of the parts within the principles of the present disclosure, up to and including, the full extent established by the broad general meaning of the terms used in the claims.

What is claimed is:

1. An anti-fogging coating composition comprising:
a dopamine;
a hydrophilic polymer;
a plurality of inorganic oxide particles; and
a solvent.

2. The anti-fogging coating composition of claim 1, wherein the dopamine has a mass percentage of about 1% to about 20% of a total mass of the anti-fogging coating composition, the hydrophilic polymer has a mass percentage of about 10% to about 45% of the total mass of the anti-fogging coating composition, the plurality of the inorganic oxide particles has a mass percentage of about 40% to about 80% of the total mass of the anti-fogging coating composition, the solvent has a mass percentage of about 5% to about 47% of the total mass of the anti-fogging coating composition.

3. The anti-fogging coating composition of claim 1, wherein the hydrophilic polymer has at least one aminogroup, the hydrophilic polymer is selected from a linear polymer, a nonlinear polymer, or any combination thereof.

4. The anti-fogging coating composition of claim 3, wherein the linear polymer is selected from a polymer of hydrophilic monomer and N-(3-Aminopropyl)methacrylamide (1°-N), a polymer of hydrophilic monomer and N-[3-(Dimethylamino)propyl]methacrylamide (2°-N), a polymer of hydrophilic monomer and [3-(Methacryloylamino)propyl]trimethylammonium (3°-N), or any combination thereof, the hydrophilic monomer is selected from polyethylene glycol methacrylic acid, N-vinylpyrrolidone, N,N-Dimethylacrylamide, allyl phenyl ether, or any combination thereof.

5. The anti-fogging coating composition of claim 3, wherein the nonlinear polymer is selected from a polymer of polyethyleneimine and polyethylene glycol, a polymer of polyethyleneimine and polyvinyl pyrrolidone, or any combination thereof.

6. The anti-fogging coating composition of claim 1, wherein the plurality of inorganic oxide particles is selected from particles of silica, zirconia, alumina, titania, or any combination thereof.

7. The anti-fogging coating composition of claim 1, wherein the solvent is water, an alcohol aqueous solution, or an oxidizing aqueous solution, the alcohol aqueous solution is a methanol aqueous solution, an ethanol aqueous solution, or a propanol aqueous solution, the oxidizing aqueous solution is a sodium periodate aqueous solution.

8. An anti-fogging film formed from:
an anti-fogging coating composition, the anti-fogging coating composition comprising:
a dopamine;
a hydrophilic polymer;
a plurality of inorganic oxide particles; and
a solvent.

9. The anti-fogging film of claim 8, wherein the dopamine has a mass percentage of about 1% to about 20% of a total mass of the anti-fogging coating composition, the hydrophilic polymer has a mass percentage of about 10% to about 45% of the total mass of the anti-fogging coating composition, the plurality of the inorganic oxide particles has a mass percentage of about 40% to about 80% of the total mass of the anti-fogging coating composition, the solvent has a mass percentage of about 5% to about 47% of the total mass of the anti-fogging coating composition.

10. The anti-fogging film of claim 8, wherein the hydrophilic polymer has at least one amino-group, the hydrophilic polymer is selected from a linear polymer, a nonlinear polymer, or any combination thereof.

11. The anti-fogging film of claim 10, wherein the linear polymer is selected from a polymer of hydrophilic monomer and N-(3-Aminopropyl)methacrylamide (1°-N), a polymer of hydrophilic monomer and N-[3-(Dimethylamino)propyl]methacrylamide (2°-N), a polymer of hydrophilic monomer and [3-(Methacryloylamino)propyl]trimethylammonium (3°-N), or any combination thereof, the hydrophilic monomer is selected from polyethylene glycol methacrylic acid, N-vinylpyrrolidone, N,N-Dimethylacrylamide, allyl phenyl ether, or any combination thereof.

12. The anti-fogging film of claim 10, wherein the nonlinear polymer is selected from a polymer of polyethyleneimine and polyethylene glycol, a polymer of polyethyleneimine and polyvinyl pyrrolidone, or any combination thereof.

13. The anti-fogging film of claim 8, wherein the plurality of inorganic oxide particles is selected from particles of silica, zirconia, alumina, titania, or any combination thereof, the solvent is water, an alcohol aqueous solution, or an oxidizing aqueous solution, the alcohol aqueous solution is a methanol aqueous solution, an ethanol aqueous solution, or a propanol aqueous solution, the oxidizing aqueous solution is a sodium periodate aqueous solution.

14. A transparent article comprising:
a substrate; and
an anti-fogging film attached to at least one surface of the substrate, the anti-fogging film is formed from an anti-fogging coating composition, the anti-fogging coating composition comprising:
a dopamine;
a hydrophilic polymer;
a plurality of inorganic oxide particles; and
a solvent.

15. The transparent article of claim 14, wherein the dopamine has a mass percentage of about 1% to about 20% of a total mass of the anti-fogging coating composition, the hydrophilic polymer has a mass percentage of about 10% to about 45% of the total mass of the anti-fogging coating composition, the plurality of the inorganic oxide particles has a mass percentage of about 40% to about 80% of the total mass of the anti-fogging coating composition, the solvent has a mass percentage of about 5% to about 47% of the total mass of the anti-fogging coating composition.

16. The transparent article of claim 14, wherein the hydrophilic polymer has at least one amino-group, the hydrophilic polymer is selected from a linear polymer, a nonlinear polymer, or any combination thereof.

17. The transparent article of claim 16, wherein the linear polymer is selected from a polymer of hydrophilic monomer and N-(3-Aminopropyl)methacrylamide (1°-N), a polymer of hydrophilic monomer and N-[3-(Dimethylamino)propyl]methacrylamide (2°-N), a polymer of hydrophilic monomer and [3-(Methacryloylamino)propyl]trimethylammonium (3°-N), or any combination thereof, the hydrophilic monomer is selected from polyethylene glycol methacrylic acid, N-vinylpyrrolidone, N,N-Dimethylacrylamide, allyl phenyl ether, or any combination thereof.

18. The transparent article of claim 16, wherein the nonlinear polymer is selected from a polymer of polyethyleneimine and polyethylene glycol, a polymer of polyethyleneimine and polyvinyl pyrrolidone, or any combination thereof.

19. The transparent article of claim 14, wherein the plurality of inorganic oxide particles is selected from particles of silica, zirconia, alumina, titania, or any combination thereof.

20. The transparent article of claim 14, wherein the solvent is water, an alcohol aqueous solution, or an oxidizing aqueous solution, the alcohol aqueous solution is a methanol aqueous solution, an ethanol aqueous solution, or a propanol aqueous solution, the oxidizing aqueous solution is a sodium periodate aqueous solution.

* * * * *